United States Patent
Corona et al.

(10) Patent No.: US 11,165,833 B2
(45) Date of Patent: Nov. 2, 2021

(54) NETWORK ROUTING BASED ON TERMINAL'S MEDIA PATH

(71) Applicant: T-Mobile USA, Inc., Bellevue, WA (US)

(72) Inventors: A. Karl Corona, Maple Valley, WA (US); Robert Ara Kondakjian, Snohomish, WA (US); Nassereddine Sabeur, Seattle, WA (US)

(73) Assignee: T-Mobile USA, Inc., Bellevue, WA (US)

(*) Notice: Subject to any disclaimer, the term of this patent is extended or adjusted under 35 U.S.C. 154(b) by 543 days.

(21) Appl. No.: 15/341,398

(22) Filed: Nov. 2, 2016

(65) Prior Publication Data

US 2018/0124124 A1  May 3, 2018

(51) Int. Cl.
*H04L 29/06* (2006.01)
*H04L 29/12* (2006.01)
*H04L 12/751* (2013.01)

(52) U.S. Cl.
CPC ...... *H04L 65/1069* (2013.01); *H04L 61/1511* (2013.01); *H04L 65/105* (2013.01);
(Continued)

(58) Field of Classification Search
CPC ............. H04L 61/1511; H04L 65/1006; H04L 65/1016; H04L 65/105; H04L 65/1073; H04L 65/1069
See application file for complete search history.

(56) References Cited

U.S. PATENT DOCUMENTS

| 8,667,150 B2 * | 3/2014 | Ku | H04L 61/157 709/228 |
| 2009/0129263 A1 * | 5/2009 | Osborn | H04L 63/08 370/230 |

(Continued)

OTHER PUBLICATIONS

Mealling, "Dynamic Delegation Discovery System (DDDS) Part Three: The Domain Name System (DNS) Database" Oct. 2002, IETF, RFC 3403. (Year: 2002).*

(Continued)

*Primary Examiner* — Hitesh Patel
*Assistant Examiner* — Eui H Kim
(74) *Attorney, Agent, or Firm* — Lee & Hayes, P.C.

(57) ABSTRACT

A routing device of a telecommunications network can receive an initiation request of a communication session. The initiation request can include a destination identifier associated with a terminal. The routing device can query a responder for terminal-associated serving-network information. The routing device can then forward the initiation request to a serving network identified by the serving-network information. In some examples, the responder can query a registry for network-attachment information indicating a current media path associated with the terminal. The responder can provide the serving-network information based at least in part on the network-attachment information. In some examples, the destination identifier can include a global name, and the serving-network information can include an associated local name In some examples, the routing device can include an S-CSCF or ISBC, the responder can include an ENUM server, or the registry can include an HSS.

14 Claims, 6 Drawing Sheets

(52) U.S. Cl.
CPC ...... *H04L 65/1006* (2013.01); *H04L 65/1016* (2013.01); *H04L 65/1073* (2013.01); *H04L 45/02* (2013.01); *H04L 61/157* (2013.01); *H04L 61/3085* (2013.01); *H04L 61/605* (2013.01)

(56) References Cited

U.S. PATENT DOCUMENTS

| | | | |
|---|---|---|---|
| 2009/0161666 A1* | 6/2009 | Ku | H04L 29/1216 370/356 |
| 2011/0222532 A1 | 9/2011 | Noldus | |
| 2012/0143982 A1 | 6/2012 | Oster et al. | |
| 2013/0017853 A1* | 1/2013 | Johansson | H04W 8/26 455/517 |
| 2013/0084860 A1* | 4/2013 | Wong | H04W 60/00 455/435.1 |
| 2013/0114592 A1* | 5/2013 | Arauz-Rosado | H04L 29/12896 370/352 |
| 2013/0170386 A1* | 7/2013 | Gonzalez De Langarica | H04M 15/82 370/252 |
| 2014/0006629 A1* | 1/2014 | Lau | H04L 67/146 709/227 |
| 2014/0018039 A1* | 1/2014 | Lau | H04W 8/20 455/411 |
| 2014/0098819 A1 | 4/2014 | You et al. | |
| 2014/0294017 A1* | 10/2014 | Naito | H04L 65/602 370/471 |
| 2014/0301191 A1* | 10/2014 | Ludwig | H04W 28/0268 370/230 |
| 2015/0043429 A1* | 2/2015 | Kim | H04L 67/18 370/328 |
| 2015/0195773 A1 | 7/2015 | Weng | |
| 2016/0105468 A1* | 4/2016 | Mufti | H04L 65/1016 709/228 |
| 2016/0127305 A1* | 5/2016 | Droms | H04L 61/1511 709/223 |
| 2016/0150574 A1* | 5/2016 | Edge | H04W 4/029 455/404.2 |
| 2016/0226923 A1* | 8/2016 | Purkop | H04L 65/1069 |
| 2017/0006164 A1* | 1/2017 | Ku | H04L 61/1511 |
| 2017/0339740 A1* | 11/2017 | Abichandani | H04W 76/18 |

OTHER PUBLICATIONS

"ENUM Explained—Managed Services" GSMA, retrieved on Aug. 1, 2016 from «http://www.gsma.com/managedservices/number-portability-services/about-pathfinder-enum/enum-explained/», 4 pages.

"ETSI TS 123 078, Technical Specification", 3GPP TS 21078, version 13.0.0, release 13, Jan. 2016, pp. 1, 38-41, 516-518, 540-542.

"ETSI TS 124 229, Technical Specification", 3GPP TS 24.229, version 13.5.1, release 13, May 2016, pp. 1, 78, 192-199, 238-249, 759, 763, 806.

"ETSI TS 129 328, Technical Specification", 3GPP TS 29328, version 13.4.0, release 13, Apr. 2016, pp. 1, 8-27, 30-39, 42-50, 68-71.

"HLR API Reference", mblox, retrieved Aug. 1, 2016, from «http://manage.mblox.com/developers/hlr.html». 11 pages.

Interconnect Session Border Controller (ISBC), retrieved Jul. 18, 2016, from «http://simplelte4g.blogspot.com/2011/06/interconnect-session-border-controller.html» 1 page.

"Official Document IR.34—Guidlines for IPX Provider Networks", GSM Association, Version 12.0, Jan. 11, 2016, pp. 1, 6-12, 15, 17-19, 45.

"Official Document IR.65—IMS Roaming and Interworking Guidelines", GSM Association, Version 20.0, Jun. 7, 2016, pp. 1, 24, 28-31, 36-39.

"Official Document IR.67—DNS and ENUM Guidelines for Service Providers and GRX and IPX", GSM Association, Version 12.0, Feb. 1, 2016, pp. 1-8, 22-24, 32, 45-49, 51-65, 73-89.

"Roaming Procedures (Roaming in a GSM Network) Part 2", retrieved Aug. 1, 2016, from «http://what-when-how.com/roaming-in-wireless-networks/roaming-procedures-roaming-in-a-gms-network-part-2/», 8 pages.

"Signaling System No. 7, Call Handling, InformIT", retrieved Aug. 1, 2016, from «http://www.informit.com/library/content.aspx?b=Signaling_System_No_7&seqNum=118», 2 pages.

"Sonus Breakout Gateway Control Function (BGCF) Routing Server", 2 pages.

Stastny, R., "VoIP and ENUM the Austrian Trial", IETF # 57 Vienne 2003, Jul. 14, 2003, retrieved from «https://www.ietf.org/proceedings/57/slides/enum-3/enum-3.ppt», 13 pages.

TTA Standard, ENUM DNS Tier 1, 2 Architecture, Dec. 23, 2004, 30 pages.

PCT Search Report and Written Opinion dated Jan. 23, 2018 for PCT application No. PCT/US17/56799, 10 pages.

Extended European Search Report from the European Patent Office for Application No. 17866569.1, dated Mar. 24, 2020, a counterpart foreign application of U.S. Appl. No. 15/341,398, 10 pgs.

Siemens AG, "ENUM/DNS interface fro 3GPP IMS subscriber database (HSS) to ease provisioning of ENUM data", IP.COM Journal, IP.COM Inc., Aug. 2006, 2 pgs.

* cited by examiner

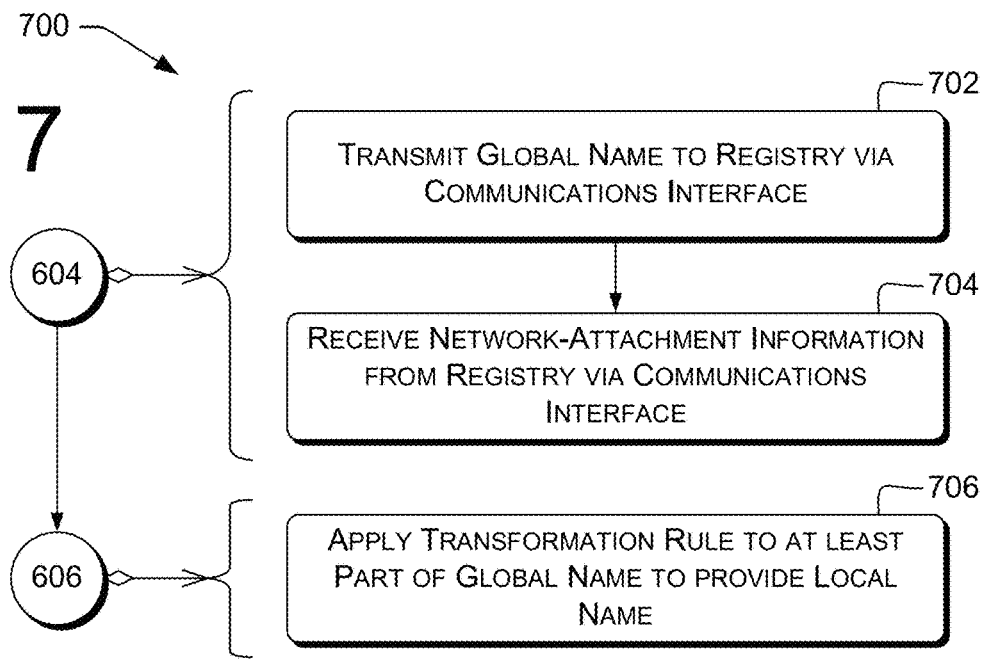

NETWORK ROUTING BASED ON TERMINAL'S MEDIA PATH

BACKGROUND

Many computing devices configured for telecommunications, such as smartphones, can communicate via a variety of networks. Cellular and other portable communications devices may connect with networks of varying capability either within a communication session or between communication sessions. To permit sessions between users of different network operators, network-network interconnection (NNI) techniques and devices are used to interface different operators' networks.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items. For brevity of illustration, in the diagrams herein, an arrow beginning with a diamond connects a first component or operation (at the diamond end) to at least one second component or operation that is or can be included in the first component or operation.

FIG. 7 illustrates an example process for processing a request for serving-network information according to some implementations.

FIG. 8 illustrates an example process for establishing a communication session according to some implementations.

DETAILED DESCRIPTION

Overview

Figure 1:
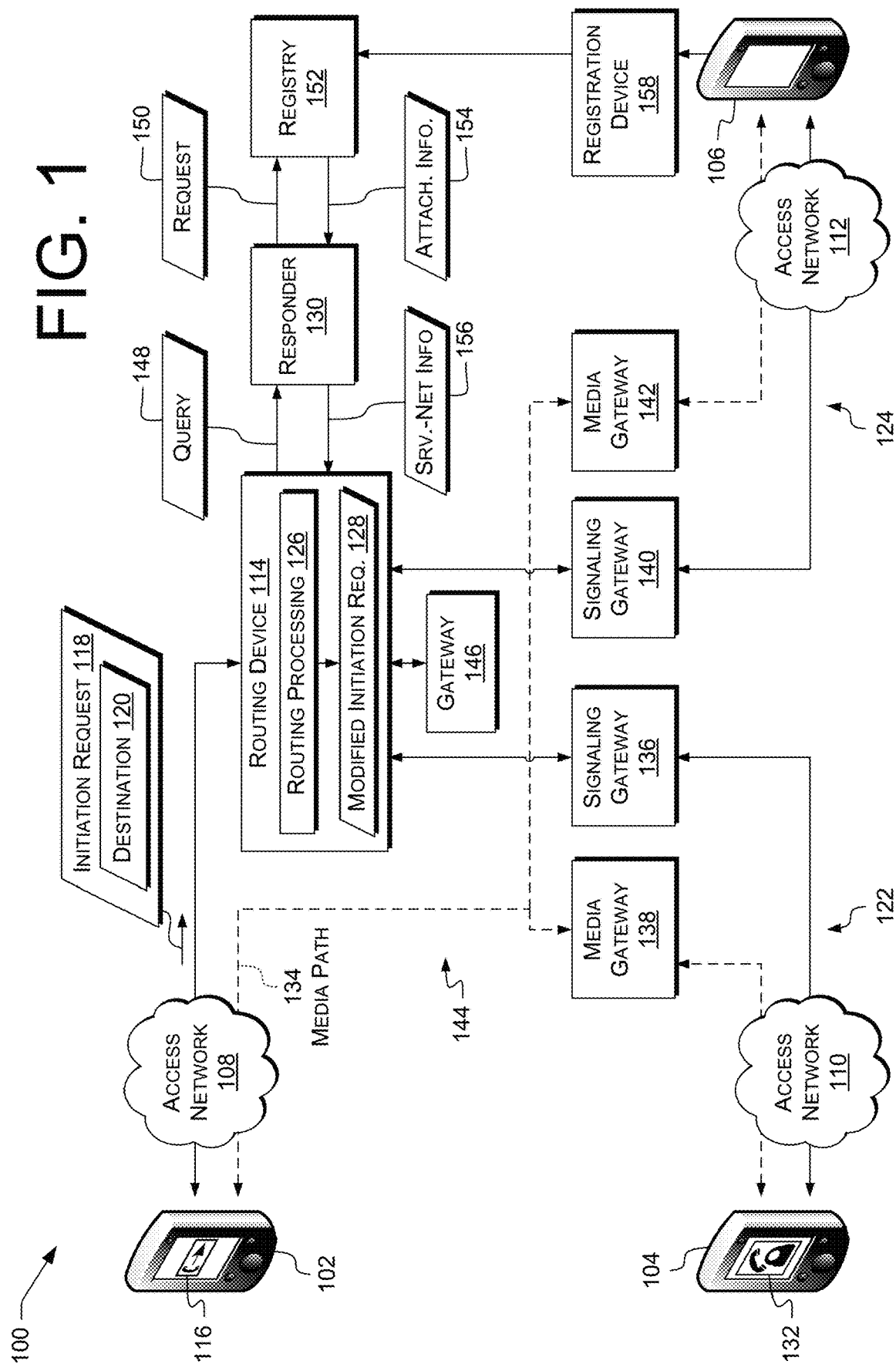
FIG. 1 is a block diagram illustrating a system for implementing session routing according to some implementations.

In some telecommunications networks, calls (or other communication sessions) are placed from an originating (MO) terminal to a terminating (MT) terminal. In some example networks, all calls pass through an Internet Protocol (IP) Multimedia Subsystem (IMS) or other core network associated with the MT. In some of these networks, an inbound proxy, e.g., an IMS interrogating call session control function (I-CSCF), associated with the MT routes signaling traffic of the call. However, in some IMS networks, the I-CSCF routes signaling traffic even for non-IMS calls such as circuit-switched (CS) domain calls. This increases load on the IMS core, particularly in the case of interconnections to other operators' IMS networks via NNI.

In some examples herein, a routing device associated with the MO queries a responder for serving-network information of the MT. The responder can query a registry, which can provide information indicating a current media path associated with the MT. The MO routing device can then communicate directly with the serving network, removing the need to communicate via the MT I-CSCF (or other inbound proxy) if the call is not an IMS call. Accordingly, some example systems and techniques described herein permit making more effective use of available network bandwidth by reducing the number of network elements involved in connections between terminals. Routing more directly to a serving network, with fewer intermediate nodes, can also reduce call-setup times, improving the usability of the network.

The terms "user equipment," "UE," and "terminal" may be used interchangeably herein to describe any communication or computing device capable of performing techniques described herein with respect to terminals. The terms "session" or "call" as used herein include a communications path for bidirectional exchange of data among two or more terminals. Example sessions include voice and video calls, e.g., by which human beings converse, a data communication session, e.g., between two electronic systems or between an electronic system and a human being, or a Rich Communication Suite (RCS, also known as JOYN) session. As used herein, a "serving network" of a terminal includes a network or portion of a network with which that terminal is registered and via which that terminal can send and receive communications. For example, a serving network can be a particular operator's own network, or can be a network in which the terminal is roaming. A serving network can include at least one of an access network or a core network.

Example networks carrying sessions include second-generation (2G) cellular networks such as the Global System for Mobile Communications (GSM) and third-generation (3G) cellular networks such as the Universal Mobile Telecommunication system (UMTS). Other example networks include fourth-generation (4G) cellular networks, such as Long Term Evolution (LTE) carrying Voice Over LTE (VoLTE) sessions using Session Initiation Protocol (SIP) signaling, the public switched telephone network (PSTN) using Signaling System 7 (SS7) signaling, and data networks, such as Institute of Electrical and Electronics Engineers (IEEE) 802.11 (WIFI) networks carrying voice over Internet Protocol (VoIP) calls or other over-the-top (OTT) sessions encapsulating, e.g., voice or video data in a way transparent to an underlying packet transport. GSM and the PSTN are examples of CS networks; LTE and WIFI are examples of packet-switched (PS) networks. Many networks are "heterogeneous networks," i.e., networks including devices or transport systems with various sets of capabilities. For example, many LTE cellular networks support VoLTE and also interconnect with the PSTN.

In some examples, E.164 Number Mapping (ENUM) servers are used in locating inbound proxies or other serving-network devices for MT terminals. In some examples, a responder including an ENUM server responds to a query for an MT phone number with information about whether the MT is registered in the IMS domain. Depending on the registration state, a serving call session control function (S-CSCF) or other routing device receiving the ENUM response can route the call directly to the appropriate inbound proxy, e.g., the appropriate voice domain or NNI partner. Calls to CS-domain parties therefore do not have to route through the IMS and then to a CS breakout, reducing the load on the IMS domain. In some examples, registration information provided, e.g., by a Tier 2 ENUM server, can be used for both inbound and outbound traffic routing to accelerate delivery of traffic to the IMS domain (for IMS registered subscribers) or to the CS domain (for non-IMS or non-registered IMS subscribers). In some examples, a single ENUM response includes all the information necessary for the routing device to locate or establish communications with the inbound proxy.

In some examples, a routing device, e.g., an S-CSCF of an IMS network, is communicatively connectable with cellular user equipment (UE) or another computing device or terminal. The routing device can be configured to receive an initiation request of a communication session. The initiation request can include a destination identifier associated with a terminal. The routing device can query a responder for serving-network information associated with the terminal. The routing device can then forward the initiation request to a serving network identified by the serving-network information. The responder can include, e.g., an ENUM server. The responder can query a registry, e.g., using the Diameter protocol, and provide the serving-network information based at least in part on information from the registry.

Illustrative Configurations

FIG. 1 is a block diagram illustrating a telecommunication system 100 according to some examples. The system includes terminals 102, 104, and 106, e.g., user equipment or other mobile phones or communications devices or terminals. The terminals 102-106 can be operated, e.g., by first, second, and third users respectively (not shown). The terminals 102-106 receive network connectivity, e.g., via respective access networks 108, 110, and 112. In the illustrated example, terminal 106 is communicatively connected to routing device 114 (or one or more routing devices). The routing device 114 can include, e.g., a S-CSCF of an IMS in a VoLTE-capable network.

When the first user desires to place a call to the second user, the terminal 102, e.g., in response to actuation by the first user of a "Send" control 116, transmits an initiation request 118, e.g., a SIP INVITE request beginning an outgoing voice call. The initiation request 118 can include other information. For example, a SIP INVITE can include a Session Description Protocol (SDP) body including a session description, e.g., information of attributes of the session. In an example, the session description specifies whether voice or video calling is desired. The initiation request 118 is an example of a service message of a communication session. Service messages can also be transmitted during a communication session, e.g., to transfer a file, to switch between audio and video calling, or to change access legs, e.g., in the event of a handover between access networks or base stations.

The illustrated initiation request 118 includes a destination identifier 120, e.g., identifying a terminal 104 or 106 with which terminal 102 is requesting a session be established. In this example, only two destinations are shown, namely the terminals 104 and 106. However, the initiation request 118 can specify any number of destinations. Communications with terminal 104 pass through a serving network 122, and communications with terminal 106 pass through a serving network 124, e.g., an access network or other network described above. A terminal can be configured to communicate via one type of serving network or multiple types, alternatively or simultaneously. For example, many smartphones are configured to communicate, at any given time, with a WIFI serving network and, concurrently, either a CS serving network (e.g., GSM) or a PS serving network (e.g., LTE), but not both.

The routing device 114 receives from the terminal 102 the initiation request 118 and performs routing processing 126, described below with reference to FIGS. 2-3. In some examples, routing processing 126 can include determining a modified initiation request 128. As described below, in some examples, the routing device(s) 114 interact with a responder 130 (or multiple responders) to perform the routing processing 126. In some examples, the responder 130 can include an ENUM server communicatively connected with the routing device 114. In some examples, upon receiving the initiation request 118, the routing device 114 forwards the initiation request 118 to a serving network 122, 124 via which the destination can be reached. For example, the routing device 114 can transmit the initiation request 118 or the modified initiation request 128 to the serving network 122, 124. The routing device 114 can identify the appropriate serving network 122, 124 based on information from the responder 130.

The destination, e.g., terminal 104 or 106, receives the forwarded initiation request 118 via the respective serving network 122 or 124. For brevity, examples are discussed with reference to terminal 104 being the destination. In some examples, the terminal 104 can respond, e.g., by alerting the second user and transmitting a SIP 180 Ringing response to the terminal 102. The user of the terminal 104 can then indicate the call should be accepted, e.g., by operating a call-acceptance control 132 such as a touchscreen button. The terminal 104 can then accept the communication session, e.g., by sending a SIP 200 OK response to the terminal 102. Call initiation can be performed, e.g., as defined in the GSM or VoLTE standards, and can include the exchange of additional messages (not shown) between the terminals 102 and 104 and the routing device 114. Data of the session, such as audio data or video data, can be exchanged between terminals 102 and 104 via a communications channel depicted as media path 134, which can pass through routing device 114 or can bypass routing device 114.

In some examples, serving network 122 includes or is communicatively connected with a signaling gateway 136 and a media gateway 138. In some examples, serving network 124 includes or is communicatively connected with a signaling gateway 140 and a media gateway 142. For brevity, examples below with reference to serving network 122 and related components also apply to serving network 124 and related components, unless otherwise specified.

Signaling gateway 136 can proxy signaling traffic, e.g., SIP requests and responses, between routing device 114 and access network 110. Signaling gateway 136 can include, e.g., an I-CSCF, SIP Routing Engine (SRE), Border Gateway Control Function (BGCF), or Internet Protocol (IP) Packet eXchange (IPX) peer device. Media gateway 138 can proxy media traffic, e.g., Real-time Transport Protocol (RTP) stream(s) carrying audio or video data of a session. Media gateway 138 can include, e.g., a Transition Gateway (TrGW) or Media Gateway (MGW). Routing device 114 can select a signaling gateway 136 or 140 and a media gateway 138 or 142 for communication with the destination terminal 104 or 106.

In some examples, a core network 144 includes at least one of routing device 114, responder 130, signaling gateway 136, media gateway 138, signaling gateway 140, media gateway 142, links between any of those devices, or links to access networks 108, 110, or 112. A network operator can operate at least one core network 144. Core networks can be interconnected by gateways such as gateway 146, e.g., an Interconnect Session Border Controller (ISBC) or Interconnection Border Control Function (IBCF). In some examples, core network 144 can include or be communicatively connected with an interworking function (IWF) or other device bridging networks, e.g., LTE, third-generation cellular (3G), and POTS networks. In some examples, the interworking function can bridge SS7 traffic from the PSTN into the core network 144, e.g., permitting PSTN customers to place calls to cellular customers and vice versa.

In some examples, routing device 114 can provide a query 148 to responder 130. The query 148 can include the destination identifier 120. The query 148 can request serving-network information associated with the destination, e.g., terminal 104 or another destination. The query 148 can be a DNS ENUM query. The responder 130 can transmit a request 150 to a registry 152 for network-attachment information associated with the destination. The registry 152 can include, e.g., a home subscriber server (HSS). The request 150 can be a Diameter User-Data-Request (UDR) message.

The registry 152 can then provide the network-attachment information 154 to the responder 130, e.g., as a Diameter User-Data-Answer (UDA) response. The network-attachment information 154 can indicate (e.g., include indications of), e.g., whether the destination is registered or not, what access network or type of serving network the destination is attached to (e.g., PS or CS), what network operator's network the destination is attached to, or other information useful in determining which serving network 122 or 124 can or should be used to reach the destination. The responder 130 can then determine serving-network information 156 and provide the serving-network information 156 to the routing device 114, e.g., as a DNS response such as an ENUM response. In some examples, the serving-network information 156 can include a DNS Naming Authority Pointer (NAPTR) record indicating a hostname or other Uniform Resource Identifier (URI) or Uniform Resource Locator (URL) associated with the appropriate serving network 122 or 124. The routing device 114 can then forward the initiation request 118 to the serving network identified by the serving-network information 156.

In some examples, system 100 includes a registration device 158 connectable with the terminal indicated by the destination identifier 120, e.g., terminal 104 or 106 (terminal 106 in the illustrated example). For example, registration device 158 can include an I-CSCF or S-CSCF of serving network 124. In some examples, the registry 152 is included in system 100 and is communicatively connectable with the registration device 158. For example, the registry 152 can be configured to receive at least part of the network-attachment information 154 from the registration device 158. In an IMS example, the registry 152 can include an HSS and can receive network-attachment information 154 from the registration device 158 via an IMS Cx-Put operation. The network-attachment information 154 can include, e.g., at least one of an IMS Public User Identity or a hostname of signaling gateway 140 or registration device 158, e.g., an S-CSCF.

In some examples, at least one of the serving networks 122, 124 can be a home network, e.g., a home public land mobile network (HPLMN), a visited network, e.g., a visited public land mobile network (VPLMN), a CS-domain access network of an HPLMN, or a PS-domain access network of an HPLMN. Various examples herein relate to home-routed services, in which application server(s) of a terminal's home network anchor or control communication sessions of which that terminal is a party, even when that terminal is roaming in a visited network.

Figure 2:
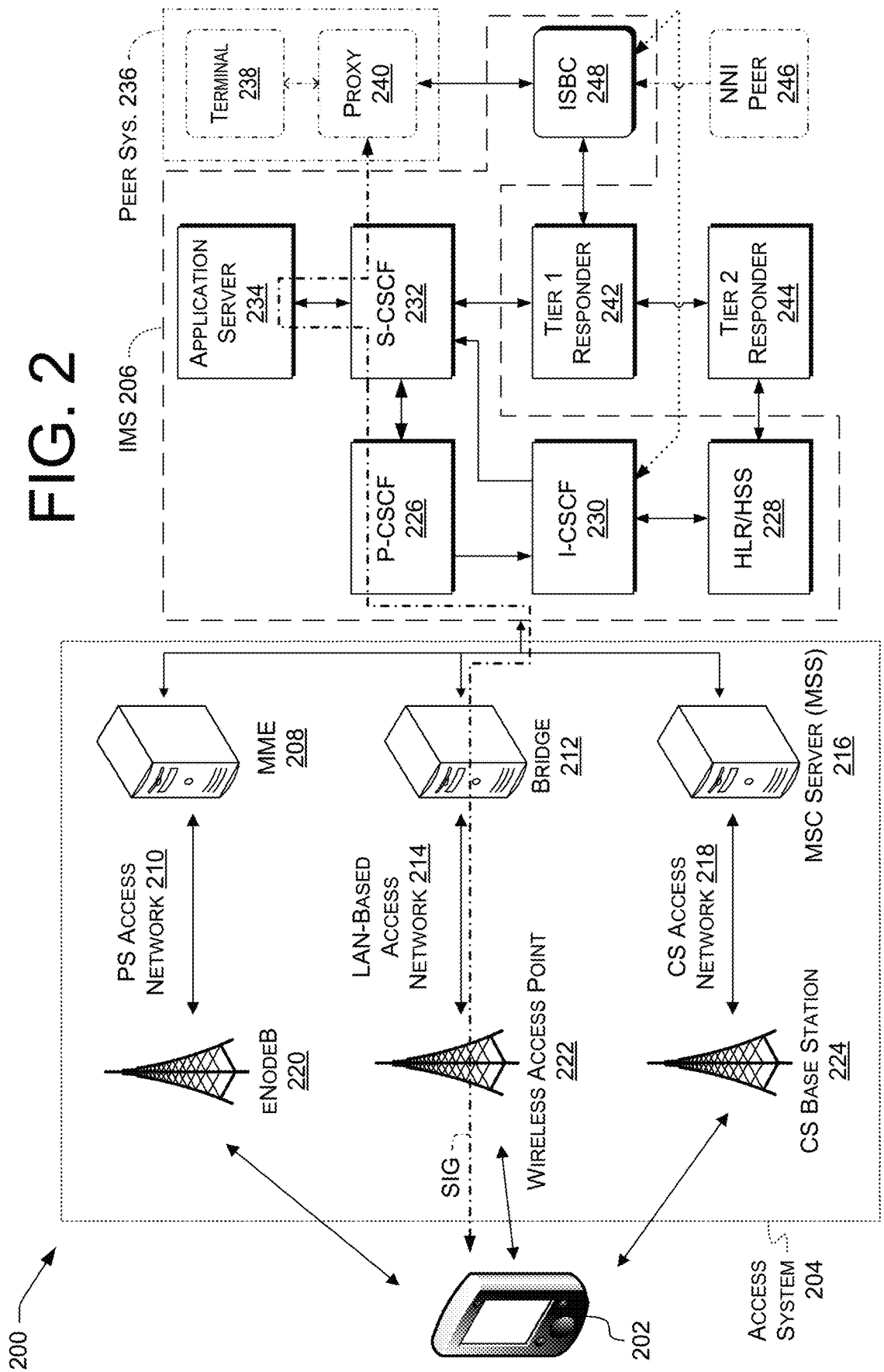
FIG. 2 illustrates an example telecommunications network, including components used to perform session routing with respect to a peer telecommunication system.

FIG. 2 illustrates an example telecommunication system 200. Terminal 202, e.g., user equipment, communicates with access system 204 of the telecommunication system 200. Access system 204 can include a first access network of a first type (e.g., LTE) and a second access network, e.g., of a second, different type (e.g., WIFI). Each of the first access network and the second access network can be configured to selectively carry a communication session of terminal 202. For example, voice calls can be carried over the first access network using voice-over-LTE (VoLTE) and over the second access network using voice-over-WIFI (VoWIFI). In some examples, the first type is a PS cellular type and the second type is a PS local-area-network type. IMS 206 communicates with access system 204 and provides media-handling services, e.g., to route video or voice data or to maintain continuity of the communication session during handover of the communication session.

In the illustrated example, access system 204 includes at least a mobility management entity (MME) 208 associated with a PS access network 210, a bridge 212 (or other packet relay) associated with a LAN-based access network 214, or a mobile switching center (MSC) server (MSS) 216 associated with a CS access network 218 (e.g., a 2G GSM or 3G UMTS access network).

The PS access network 210, e.g., an LTE access network, may include an eNodeB 220, e.g., a 4G base station or other access point, that provides connectivity to the PS access network 210. The LAN-based access network 214, e.g., a WIFI network, may include a wireless access point (WAP) 222, e.g., a WIFI WAP, that provides connectivity to the LAN-based access network 214. The CS access network 218 may include a CS base station 224 that provides connectivity to the CS access network 218. The IMS 206 of the telecommunications network may include a number of nodes, such as a proxy call session control function (P-CSCF) 226, a home location register (HLR)/HSS 228, an I-CSCF 230, an S-CSCF 232, or an application server (AS) 234, e.g., a Telephony Application Server (TAS) or Service Centralization and Continuity Application Server (SCC AS).

The telecommunications network may also include a number of devices or nodes not illustrated in FIG. 2. Such devices or nodes may include an access transfer control function (ATCF), an access transfer gateway (ATGW), a visitor location register (VLR), a serving general packet radio service (GPRS) support node (SGSN), a gateway GPRS support node (GGSN), a policy control rules function (PCRF) node, a serving gateway (S-GW), a session border controller (SBC), an ISBC or IBCF, a BGCF, or a media gateway (MGW). IMS 206 may further include a number of devices or nodes not illustrated in FIG. 2, such as a presence server and one or more additional CSCFs. A core network of the telecommunications network may be a GPRS core network or an evolved packet core (EPC) network, or may include elements from both types of core networks.

The telecommunications network may provide a variety of services to terminal 202, such as synchronous communication routing across a public switched telephone network (PSTN). Further services may include call control, switching, authentication, billing, etc. In at least one example, IMS 206 functions and devices communicate using specific services provided by the access system 204 or elements thereof, but are not directly tied to those specific services. For example, IMS 206 devices can intercommunicate using an EPC network, a GSM network, a SONET network, or an Ethernet network.

Before initializing a communication session, the terminal 202 may register with the IMS 206 of the telecommunications network. To do this, the terminal 202 sends a SIP REGISTER request to the IMS 206 via an access network, e.g., via the eNodeB 220 and MME 208 of the PS access network 210. The P-CSCF 226 of the IMS 206 may receive the SIP REGISTER request. P-CSCF 226 may forward the REGISTER request directly to S-CSCF 232, or may forward the request to I-CSCF 230, which can locate an appropriate S-CSCF 232, e.g., using stored database information or information from HLR/HSS 228. I-CSCF 230 can then forward the REGISTER request to the located S-CSCF 232. In some examples, the P-CSCF 226 is located in a visited network of terminal 202 and the I-CSCF 230 and S-CSCF 232 are located in a home network of terminal 202. The S-CSCF 232 or other components (omitted for brevity) of the IMS 206 can store information about the terminal 202 in the HLR/HSS 228 and then send a SIP response to the terminal 202 to complete the IMS registration of the communication session.

In some examples of session control, a signaling path ("SIG") of the communication session passes through P-CSCF 226, S-CSCF 232, and AS 234, as indicated by the dash-dot arrow. After AS 234, the example signaling path passes back through S-CSCF 232 to a network node of a peer telecommunication system 236 (shown in phantom). The network node of the peer system 236 is referred to for brevity as a "peer." Peer system 236 can be operated by the same operator as IMS 206 or by a different operator. For example, IMS 206 and peer system 236 can be two IMSes operated by the same operator, or IMSes operated by respective, different operators. In some examples, peer system 236 is a PSTN or a 2G or 3G cellular network.

In an example in which terminal 202 is an originating (MO) UE, the peer can be, e.g., an S-CSCF corresponding to a terminating (MT) terminal 238, which can represent terminal 104 or 106. In the illustrated example, the peer is an inbound proxy 240 of the peer system 236, e.g., an I-CSCF or BGCF. In the illustrated and other examples, the peer, e.g., inbound proxy 240, is communicatively connectable with routing device 114, e.g., S-CSCF 232. Although peer system 236, proxy 240, and terminal 238 are shown in phantom, this is not limiting. At least one of peer system 236, proxy 240, and terminal 238 can be separate from system 200. Additionally or alternatively, peer system 236 and proxy 240 can be part of system 200.

In the illustrated example, the AS 234 is an anchoring network device and proxies signaling traffic for the communication session, e.g., operating as a SIP proxy or back-to-back user agent (B2BUA). In another example, the MSS 216 can be an anchoring network device and can proxy signaling traffic for the communication session, e.g., GSM or SS7 signaling traffic. The AS 234 (or other anchoring network device, and likewise throughout) can provide session-control services to terminal 202.

In some examples, S-CSCF 232 or another routing device can query a responder 242 for serving-network information associated with a destination such as a terminal. In the illustrated example, responder 242 is an example of a Tier 1 responder, i.e., a responder that does not have the serving-network information but can forward a query towards a responder that does. In the illustrated example, responder 242 forwards the query to Tier 2 responder 244. Any number of responders can be used, and can forward queries to other responders based on, e.g., a prefix of the destination identifier such as a country code (CC), numbering-plan area (NPA), or exchange ("NXX" in the North American Numbering Plan Area).

In the illustrated example, Tier 2 responder 244 requests network-attachment information from the HLR/HSS 228, which can represent registry 152, FIG. 1, or from another registry 152. Tier 2 responder 244 then determines serving-network information based on the network-attachment information. Tier 2 responder 244 provides the serving-network information to Tier 1 responder 242, which provides the serving-network information to the routing device, e.g., S-CSCF 232. Determining the serving-network information at the Tier 2 responder 244 rather than at the S-CSCF 232 can reduce the complexity of call processing at the S-CSCF 232, which can in turn reduce the latency of call setup.

In some examples, the serving-network information includes a hostname of inbound proxy 240 or of another peer network node. In some prior schemes, S-CSCF 232 routes initiation requests 118 based solely on the hostname of a next-hop peer. However, in some prior schemes, traffic for an IMS subscriber's terminal is sent to the subscriber's home IMS even if that terminal is currently connected via a CS access network 218, and therefore not directly reachable through IMS. In some examples, therefore, the network-attachment information provided by HLR/HSS 228 to Tier 2 responder 244 indicates a current media path associated with the terminal. Responder 244 determines the serving-network information based at least in part on the media path. The network-attachment information can indicate the current media path by at least one of a type of the media path, a name of a host or operator of the media path, or a network address of the media path.

In an example, for a terminal of an IMS subscriber connected via PS access network 210, the media path is a PS type, indicating that media for the terminal should be transmitted via a packet data network. Responder 244 can determine the serving-network information including a network address of an I-CSCF or other component associated with an IMS or other packet-media network. In another example, for a terminal of an IMS subscriber connected via CS access network 218, the media path is a CS type, indicating that media for the terminal should be transmitted via a circuit-switched network. Responder 244 can determine the serving-network information including a network address of an SRE, a BGCF, or another component associated with a UMTS or other network carrying media via circuit-switched connections. Determining the serving-network information based at least in part on a media-path type can reduce signaling delay and bandwidth, e.g., by routing signaling for CS calls directly from the routing device to a BGCF rather than from the routing device to an I-CSCF, to an S-CSCF, and then to a BGCF.

The devices and networks illustrated in FIG. 2 can be examples of the devices and networks illustrated in FIG. 1 and described above. For instance, terminal 202 can represent terminal 102, 104, or 106, or any of PS access network 210, LAN-based access network 214, or CS access network 218 can represent access network 108, 110, or 112. Also, the eNodeB 220 can be an access point for the PS access network 210, and the CS base station 224 can be a base station for the CS access network 218. Responder 130 can represent responders 242 and 244, or only one of those, or any number of tiered responders. Accordingly, the descriptions of the devices and networks of FIG. 1 apply to the devices and networks of FIG. 2. The devices and networks of FIG. 2 may cooperate to accomplish signaling-traffic routing, e.g., as shown in FIG. 1 and described herein. They may also cooperate to accomplish the initiation of a communication session of terminal 202. Techniques described herein with respect to origination of communication sessions can also be used for termination of sessions or for messages sent during an established phase of a communication session, in some examples.

In some examples, instead of P-CSCF 226 providing the initiation request 118 to S-CSCF 232, an Network-Network Interconnection (NNI) peer device 246 (shown in phantom) can provide the initiation request 118 to an ISBC 248 of the IMS 206, which can represent routing device 114, FIG. 1. The ISBC 248 can query Tier 1 responder 242, which can provide serving-network information to ISBC 248 as discussed above with reference to S-CSCF 232. ISBC 248 can then forward the initiation request to a proxy 240 selected based at least in part on the serving-network information. In some examples of calls via NNI peer device 246 to a terminal 202 registered in IMS 206, ISBC 248 can forward the request to I-CSCF 230, as indicated by the dotted arrow.

Figure 3:
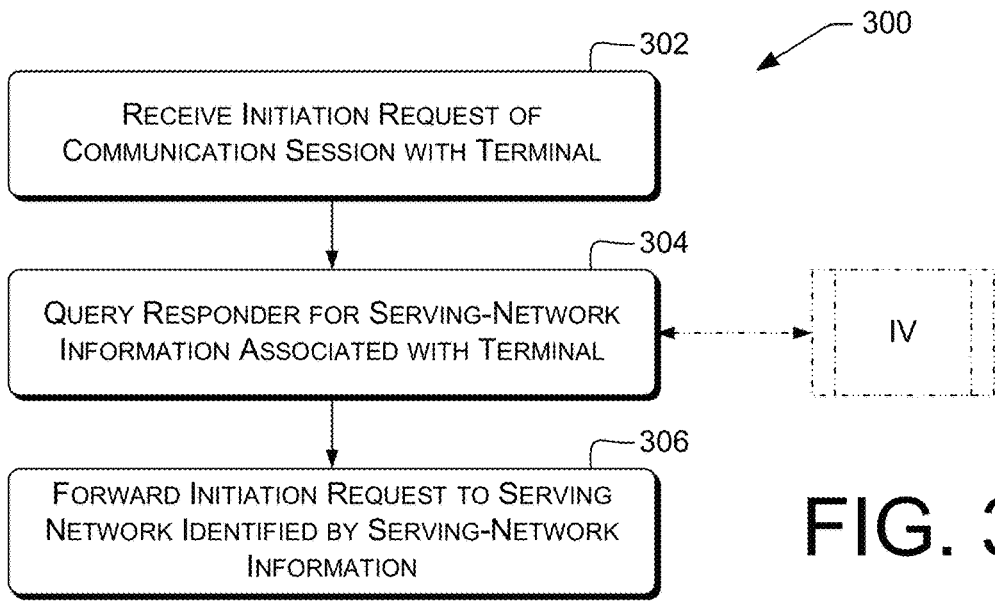
FIG. 3 illustrates an example process for establishing a communication session according to some implementations.

FIG. 3 illustrates an example process 300 for establishing a communication session. Process 300 can be performed, e.g., by a routing device of a telecommunication system, e.g., routing device 114, such as S-CSCF 232 or ISBC 248. The routing device 114 can be communicatively connectable with user equipment, e.g., terminal 102, of a telecommunication system 100. Operations shown in FIG. 3 and in FIGS. 4-8, discussed below, can be performed in any order except when otherwise specified, or when data from an earlier step is used in a later step. For clarity of explanation, reference is herein made to various components shown in FIGS. 1 and 2 that can carry out or participate in the steps of the exemplary method. It should be noted, however, that other components can be used; that is, exemplary method(s) shown in FIGS. 3-8 are not limited to being carried out by the identified components, and are not limited to including the identified operations or messages.

In some examples, at block 302, the routing device 114 can receive an initiation request 118 of a communication session to be established with a destination, e.g., terminal 238. The initiation request 118 can include a destination identifier 120 associated with terminal 238 or another terminal, e.g., a UE or another network-attached or -attachable device. Examples are discussed above, e.g., with reference to FIG. 1. In some examples, block 302 can include receiving the initiation request from at least one of a TAS or an NNI peer device.

In some examples, at block 304, the routing device 114 can provide a query 148 for serving-network information 156 associated with the terminal. The routing device 114 can provide the query 148, e.g., to a responder 130. As noted above, the serving network can be an access network operated by the operator of the routing device 114, or can be another operator's network. Examples are discussed above, e.g., with reference to FIG. 1. In some examples, block 304 can include receiving the serving-network information 156, e.g., from the responder 130, in response to the query 148. As represented by the "IV" predefined process, block 304 can include performing, or communicating with a device that performs, operations described herein with reference to FIG. 4.

For example, the initiation request can include a Session Initiation Protocol (SIP) INVITE message and the destination identifier 120 can include a Request-URI of the INVITE. The Request-URI can include a tel URI, e.g., "tel:+14575550123", or a SIP URI, e.g., "sip:+14575550123@sip.example.net". At block 304, the routing device 114 can determine the query 148, e.g., by transforming the number indicated in the Request-URI to a valid ENUM query, e.g., a query for at least one of NS or NAPTR records associated with "3.2.1.0.5.5.5.7.5.4.1.e164enum.net" (an E.164-format global number, digits reversed, each digit as its own DNS label). In some examples, block 304 can include local-to-global number processing, e.g., to convert the dialed number "555-0123" into "+14575550123" when dialing from within the 457 area code. Block 304 can include receiving the serving-network information 156 including DNS records, e.g., NS or NAPTR records, from the responder 130. In some examples, the serving-network information 156 can include a network address, e.g., of inbound proxy 240.

In some examples, at block 306, the routing device 114 can forward the initiation request 118 to a serving network identified by the serving-network information 156. Examples are discussed above, e.g., with reference to FIG. 1. For example, the routing device 114 can transmit the initiation request 118 (or a copy thereof) to the serving network 122 or 124. In some examples, block 306 can include forwarding the initiation request to an inbound proxy 240 of the serving network, e.g., an I-CSCF or BGCF.

In some examples, the routing device 114 is configured to forward the initiation request 118 before, or without, establishing a connection with the registry 152. For example, using techniques herein, the routing device 114, e.g., an S-CSCF or I-CSCF, can receive information useful for determining where to forward the initiation request 118 without needing to directly communicate with the registry 152, e.g., an HSS. In some prior schemes, an S-CSCF performs an ENUM lookup to determine a SIP URI associated with a dialed phone number, and routes a SIP INVITE according to that SIP URI. The device receiving the forwarded INVITE, e.g., an I-CSCF, then queries the HSS to determine how the INVITE should be routed. In some examples herein, forwarding the initiation request 118 without establishing a connection with the registry 152, e.g., based on the serving-network information 156, can reduce call-setup delay by overlapping the HSS query and the ENUM query and permitting this portion of the routing to be performed in one step rather than two. Forwarding the initiation request 118 without establishing a connection with the registry 152 can also reduce the amount of network bandwidth required to perform routing by removing redundant data between the ENUM data and the HSS data.

In some examples, block 306 can include modifying the initiation request 118 to provide a modified initiation request 128. Block 306 can further include transmitting the modified initiation request 128 to the serving network 122 or 124. In an example of a SIP INVITE, at block 306, the routing device 114 can modify at least one of the Request-URI, the To, From, Contact, or Route headers, or the SDP body. For example, the routing device 114 can add a Route header to the initiation request 118 to provide the modified initiation request 128. In some examples, the serving-network information 156 can include a transformation rule, e.g., a regular expression and replacement text in a NAPTR record. Block 306 can include applying the transformation rule to the destination identifier 120 to provide the Request-URI or To header for the modified initiation request 128.

Figure 4:
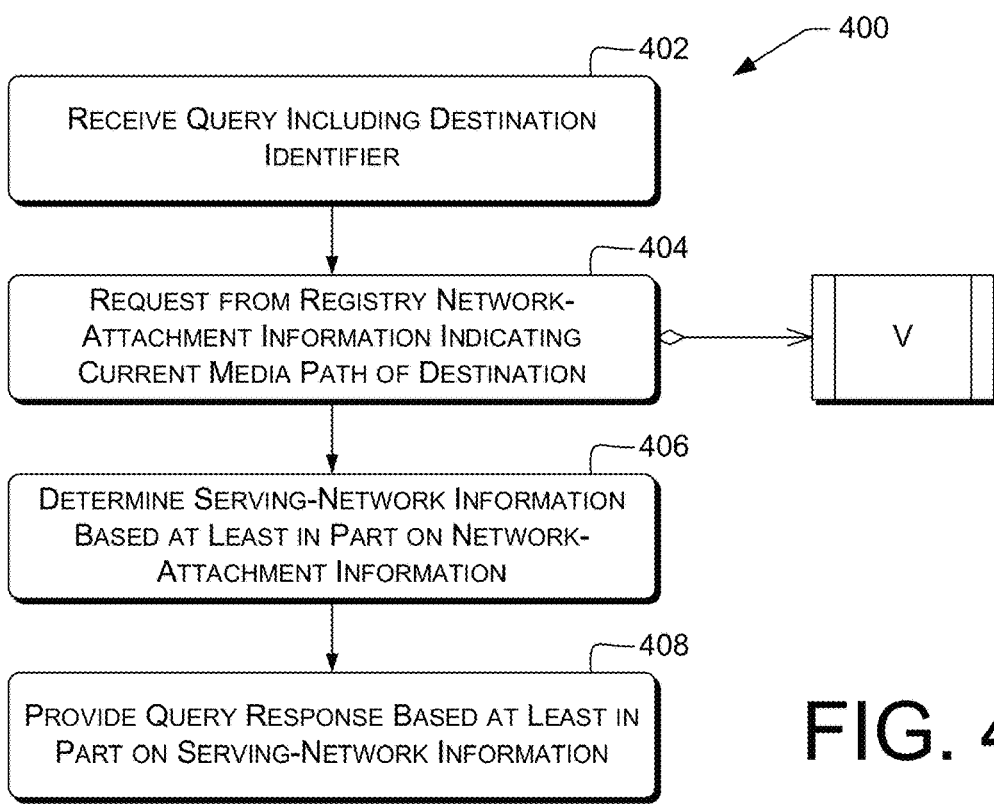
FIG. 4 illustrates an example process for determining serving-network information according to some implementations.

FIG. 4 illustrates an example process 400 for determining serving-network information. Process 400 can be performed, e.g., by a responder 130 such as a DNS server configured to respond to ENUM requests. Example ENUM requests can include DNS queries for subdomains of the "e164.arpa" or "e164enum.net" second-level domains. Block 402 can be preceded by block 304. Block 408 can be followed by block 306.

In some examples, at block 402, the responder 130 can receive a query 148 including a destination identifier 120. Responder 130 can receive the query 148, e.g., from the routing device 114. Examples are discussed above, e.g., with reference to FIG. 1.

In some examples, at block 404, the responder 130 can request, e.g., from a registry 152, network-attachment information indicating a current media path associated with a terminal or other destination identified by the destination identifier 120. For example, the responder 130 can transmit a request 150 to registry 152. Examples are discussed above, e.g., with reference to FIG. 1. As discussed above, the current media path can indicate, e.g., that media for the terminal should be provided via a CS cellular network, a PS cellular network, a cellular network operated by an operator other than the home operator of the originating terminal 102, a non-cellular network, or another type of network. In some examples, block 404 can include receiving the network-attachment information 154 from the registry 152. In some examples, block 404 can include operations described below with reference to FIG. 5. In some examples, the network-attachment information 154 can include, for a particular serving network, user state information, e.g., subscriber state information, can indicate, e.g., whether the terminal 238 is currently engaged in a session via, is idle on, or is unreachable via that serving network. In some examples, the network-attachment information 154 can include, for a particular serving network, a Mobile Country Code (MCC) and Mobile Network Code (MNC) for the serving network, a Cell Global Identification (CGI) for a cell to which the terminal 238 is currently connected, or other identification of the serving network.

In some examples, at block 406, responder 130 can determine the serving-network information 156 based at least in part on the network-attachment information 154. For example, responder 130 can determine a hostname, NAPTR record, network address, or other information useful in directing communications toward a serving network 122 or 124 via which media can be conveyed to or from the destination terminal 104 or 106, respectively. In some examples, the serving-network information 156 can include a SIP URI, tel URI, or transformation rule (e.g., regular expression plus replacement pattern) that can be applied to the destination identifier 120 to provide a URI or URL.

In some examples, the network-attachment information 154 can include respective user state information for each of one or more serving network(s). Block 406 can include determining a preferred serving network, e.g., by selecting from a predetermined ranked list of serving networks or serving-network types the highest-ranking serving network via which the destination terminal 238 can be reached. In an example of a dual-radio terminal 238, the network-attachment information 154 can indicate that the terminal 238 is reachable by both an Evolved Packet System (EPS) access network and a CS access network (e.g., GSM or UMTS). Block 406 can include selecting the EPS access network as the serving network, provided the EPS access network ranks higher than the CS access network.

In some examples, terminal 238 can be accessible via exactly one serving network. Block 406 can include determining that serving network to be the serving network for communications with terminal 238.

In some examples, at block 408, responder 130 can provide, e.g., to the routing device 114, a query response based at least in part on the serving-network information 156. For example, the query response can include at least part of, or all of, the serving-network information 156.

In some examples, at least one of blocks 406 and 408 can include determining, and providing, a NAPTR DNS record indicating the serving network. For example, the responder 130 can store or otherwise have access to a predetermined set of domain names associated with various serving networks, e.g., indexed by MCC and MNC. The responder 130 can retrieve the domain name associated with the MCC/MNC pair (or other identification) of the serving network determined for use. For example, for the MCC/MNC 001/001, the domain name can be "i-cscf.node.ims.mcc001.mnc001.3gppnetwork.org." The responder 130 can then produce a NAPTR record, e.g., by populating a predetermined template with the retrieved domain name.

In some examples, the responder 130 can store or otherwise have access to a predetermined set of templates associated with various serving networks, e.g., indexed by MCC and MNC. The responder 130 can then produce a NAPTR record, e.g., by retrieving a template associated with the network-attachment information 154. In some examples, the responder 130 can populate the retrieved template, e.g., with the original number dialed. In some examples, the responder 130 can retrieve both a domain name and a template based on respective parts (same or different) of the network-attachment information 154. The responder 130 can then populate the template with the domain name to provide the serving-network information 156.

Table 1 shows an example template and populated record for the domain name "ims.example.net". In the template, "% s" is a placeholder for the domain name. The populated NAPTR record holds a regular expression ("regex") that copies the digits of the phone number from the query to the resulting SIP URI. The populated NAPTR record can be returned as part or all of the serving-network information 156.

TABLE 1

| Description | Value |
| --- | --- |
| Template | NAPTR 100 10 "u" "E2U+sip" "!\\+?(.*)$!sip:\\1@%s;use=phone!" . |
| Populated | NAPTR 100 10 "u" "E2U+sip" "!\\+?(.*)$!sip:\\1@ims.example.net;user=phone!" . |

For context, routing device 114 can use the information in a NAPTR record to determine a SIP URI for a user-provided phone number. Routing device 114, e.g., at block 304 or 306, can perform regex processing as indicated in the NAPTR record. For example, the phone number "14575550123", processed according to the example of Table 1, yields the SIP URI "sip: 14575550123@ims.example.netuser=phone". In this way, ENUM lookup plus regex processing provides a SIP URI that can be used to establish a SIP connection to the terminal 238.

In some examples of operations discussed above with reference to FIGS. 3 and 4, routing device 114 can include an S-CSCF operated by a first operator. Some of these examples relate to an initiation request 118 transmitted by an IMS-registered terminal, e.g., via a TAS. Routing device 114 can query a Tier 0/Tier 1 ENUM server. That ENUM server can delegate the query to a Tier 2 ENUM server. If the Tier 2 ENUM server is operated by the first operator, the Tier 2 ENUM server can communicate with the registry 152, e.g., an HSS, to retrieve the network-attachment information, e.g., the MT terminal's current registrations. The Tier 2 ENUM server can then return to the routing device 114 a NAPTR record or other serving-network information. For example, the serving-network information 156 can include a domain name of "ims.example.net" (e.g., identifying an I-CSCF) for terminals currently registered in an IMS network operated by the first operator, or "tel.example.net" (e.g., identifying an SRE/BGCF) for terminals currently registered in a CS network operated by the first operator. In some examples, the serving-network information 156 can include a domain name of "operator2.example" for terminals having home networks operated by a second operator different from the first operator. For such terminals, the initiation request 118 can be forwarded via an NNI gateway and an IPX network to the second operator's network. In some examples, the serving-network information 156 can omit a domain name, or can include a reserved domain name such as "e164.arpa", to indicate that the initiation request 118 should be forwarded via an SRE or BGCF to the PSTN.

In some examples of an initiation request 118 intended for a subscriber on the first operator's network, the routing device 114 can include an ISBC or other NNI gateway. The routing device 114 can perform an ENUM query as described above. The resultant serving-network information 156 can include a domain name of "ims.example.net" for terminals currently registered in an IMS network operated by the first operator, or "tel.example.net" for terminals currently registered in a CS network operated by the first operator. The initiation request 118 can be forwarded to an I-CSCF or SRE/BGCF, respectively, as discussed above.

Figure 5:
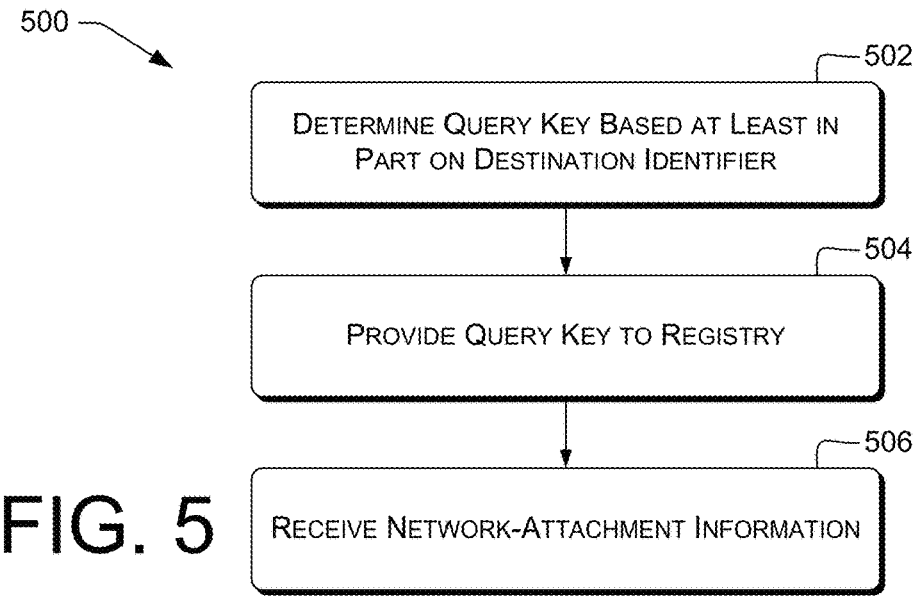
FIG. 5 illustrates an example process for processing a request for network-attachment information according to some implementations.

FIG. 5 illustrates an example process 500 for processing a request for network-attachment information 154. Process 500 can be performed, e.g., by a responder 130 such as a DNS server configured to respond to ENUM requests. Block 404 can include blocks 502-506.

In some examples, at block 502, responder 130 can determine a query key based at least in part on the destination identifier 120. For example, the destination identifier 120 can include a Mobile Station International Subscriber Directory Number (MSISDN). Block 502 can include reconstructing the destination identifier 120 from the hostname of an ENUM query, e.g., as discussed herein with reference to block 304.

In some examples, the query key can be equal to the MSISDN. Additionally or alternatively, the query key can include an IMS Public User Identity (PUI), e.g., a SIP URI or tel URI, and block 502 can include constructing a PUI. Continuing the example of block 304, block 502 can include reversing and concatenating labels of "3.2.1.0.5.5.7.5.4.1.e164enum.net" to determine the MSISDN +14575550123. Block 502 can then include forming a SIP or tel URI (e.g., a Public User Identity) from the MSISDN, e.g., "sip:14575550123@home-operator.example.netuser=phone" or "tel:+14575550123".

In some examples, at block 504, the responder 130 can provide the query key to the registry 152. For example, the responder 130 can transmit a Diameter User-Data-Request (UDR) request to the registry 152 using the Diameter protocol. The UDR can include the query key, e.g., in the Diameter User-Identity attribute-value pair (AVP).

In some examples, at block 506, the responder 130 can receive the network-attachment information, using the Diameter protocol. For example, the responder 130 can receive a Diameter User-Data-Answer (UDA) response, e.g., from the registry 152. The UDA can include a User-Data AVP holding Sh-Data, e.g., per 3GPP TS 29.328 v13.4.0 Annex C. The Sh-Data can indicate user state information for each of one or more serving network(s). For example, the Sh-Data can indicate user state for, e.g., a CS serving network, a PS serving network, an LTE EPS serving network, or other serving networks. The user state information can be used as discussed herein with reference to blocks 406 and 408 in determining serving-network information 156.

As discussed above with reference to blocks 406, 408, and 502, in some examples, the initiation request 118 comprises a Session Initiation Protocol (SIP) INVITE message, the query comprises an E.164 Number Mapping (ENUM) Domain Name System (DNS) query, and the serving-network information 156 comprises a hostname of an inbound proxy of the serving network. The hostname can be embedded in a NAPTR record of the serving-network information 156, in some examples.

Figure 6:
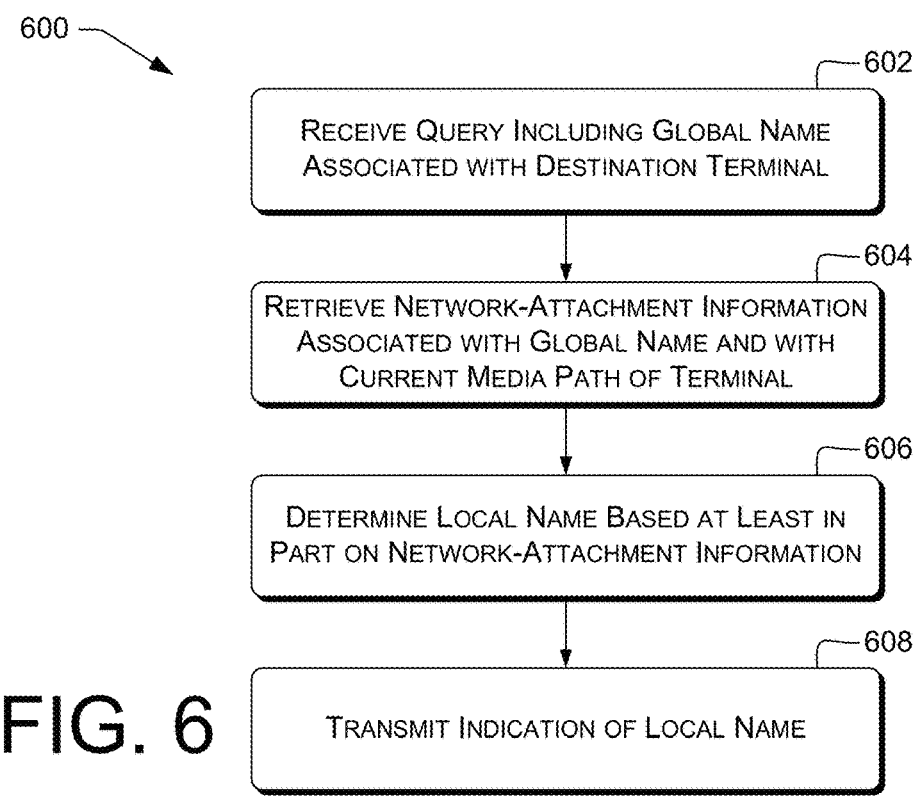
FIG. 6 illustrates an example process for processing a request for serving-network information according to some implementations.

FIG. 6 illustrates an example process 600 for processing a request for serving-network information 156. Process 600 can be performed, e.g., by a responder 130.

In some examples, at block 602, the responder 130 can receive, via a communications interface, a query 148. The query 148 can include a global name associated with a terminal, e.g., terminal 238. The global name can include, e.g., an E.164 number or other terminal identifier that is not operator-specific. In some examples, the global name does not include at least one of, or any combination of, an MCC, an MNC, or a hostname. For example, the global name can include an E.164 phone number, a tel URI, or an ENUM translation of either of those into a domain name. Examples are discussed above, e.g., with reference to FIG. 1 or blocks 406, 408, or 502.

In some examples, at block 604, the responder 130 can retrieve, from a registry 152 and via the communications interface, network-attachment information 154 associated with the global name and with a current media path of the terminal. For example, the network-attachment information 154 can indicate not only the home operator of a cellular terminal 238, but also whether terminal 238 is connected via a CS access network or a PS access network. Examples are discussed above, e.g., with reference to FIGS. 4 and 5.

In some examples, at block 606, the responder 130 can determine a local name based at least in part on the network-attachment information 154. The local name can be a routable name, e.g., a SIP URI. Examples of local names are described herein with reference to serving-network information 156 or blocks 406, 408, or 502. In some examples, the global name can include or represent a telephone number, and the local name can include at least one of a "sip" URI or a "tel" URI.

In some examples, the local name can include a tag uniquely associated with the access-network type. The tag can include, e.g., a string such as "ims" or "tel", or a predefined numeric identifier. In an example, the tag can be a tag in a DNS domain name. For example, an I-CSCF associated with a PS access network can have a hostname matching "*.ims.*.3gppnetwork.org" or "*.ims.example.net" ("*" being a wildcard matching at least one character, or at least one non-"." character, in some examples), or an SRE or BGCF associated with a PS access network can have a hostname matching "*.tel.*.3gppnetwork.org" or "*.tel.example.net". In some examples, the local name can include a network address of an inbound proxy 240, e.g., retrieved via DNS or from a hosts file. This can reduce call-setup time by removing the need to perform a separate DNS lookup for the inbound proxy 240.

In some examples, at block 608, the responder 130 can transmit, via the communications interface, an indication of the local name. For example, the responder 130 can provide a DNS response including a NAPTR Resource Record (RR). Examples are discussed above, e.g., with reference to FIG. 1 or blocks 406, 408, or 502.

FIG. 7 illustrates an example process 700 for processing a request for serving-network information 156. Process 700 can be performed, e.g., by a responder 130. Block 604 can include blocks 702 and 704. Block 606 can include block 706.

In some examples, at block 702, the responder 130 can transmit the global name to the registry 152 via the communications interface, e.g., via a Diameter interface. In some examples, the registry 152 is a remote registry, e.g., a registry not located in the same chassis as, or implemented in the same device as, the responder 130. Using remote registries can permit locating responder 130 and registry 152 independently in a network topology without losing communicative connection between them. This can permit adjusting topology to improve response times from responder 130 or registry 152.

In some examples, at block 704, the responder 130 can receive, from the registry (e.g., a remote registry) and via the communications interface, the network-attachment information 154. Examples are discussed above, e.g., with reference to block 506.

In some examples, the network-attachment information 154 indicates a transformation rule. Examples are discussed above, e.g., with reference to blocks 306 or 406. In some examples, at block 706, the responder 130 can apply the transformation rule to at least part of the global name to provide the local name. For example, block 706 can include applying the regex from a NAPTR record to the global name, e.g., an E.164 phone number, to provide the local name, e.g., a SIP URL.

FIG. 8 illustrates an example process 800 for establishing a communication session. Process 800 can be performed, e.g., by routing device 114. Block 304 can be followed by or include blocks 802-806. Blocks 802-806 can precede block 306.

In some examples, at block 802, routing device 114 can determine that at least one of the following conditions holds: (1) a query response omits the serving-network information 156, or (2) no query response was received. Block 802 can include block 804 or be followed by block 806.

For example, the query 148 can be a DNS query for NAPTR records. Block 802 can include determining that the query response omits the serving-network information 156 if the DNS response does not include any NAPTR records. In another example, the DNS response can include a NAPTR record in which none of the regular expressions match the global name, e.g., an E.164 phone number.

In some examples, at block 804, routing device 114 can determine that a timeout associated with the query has expired without the query response being received. Therefore, routing device 114 can determine that no query response was received.

In some examples, at block 806, e.g., in response to the determination at block 802 that at least one of the listed conditions holds, the routing device 114 can determine the serving-network information including a network address (e.g., an IP address or hostname) of an interconnection device, e.g., an SRE, BGCF, IBCF, or ISBC. For example, the network address can be retrieved from storage of configuration parameters of the routing device 114. As a result, the forwarding at block 306 will forward the initiation request 118 to the interconnection device. In some examples, the interconnection device can forward the call to the PSTN or to an I-CSCF that can further process the initiation request 118. This can permit completing calls even if the interaction between responder 130 and registry 152 is impaired or inconclusive.

Figure 9:
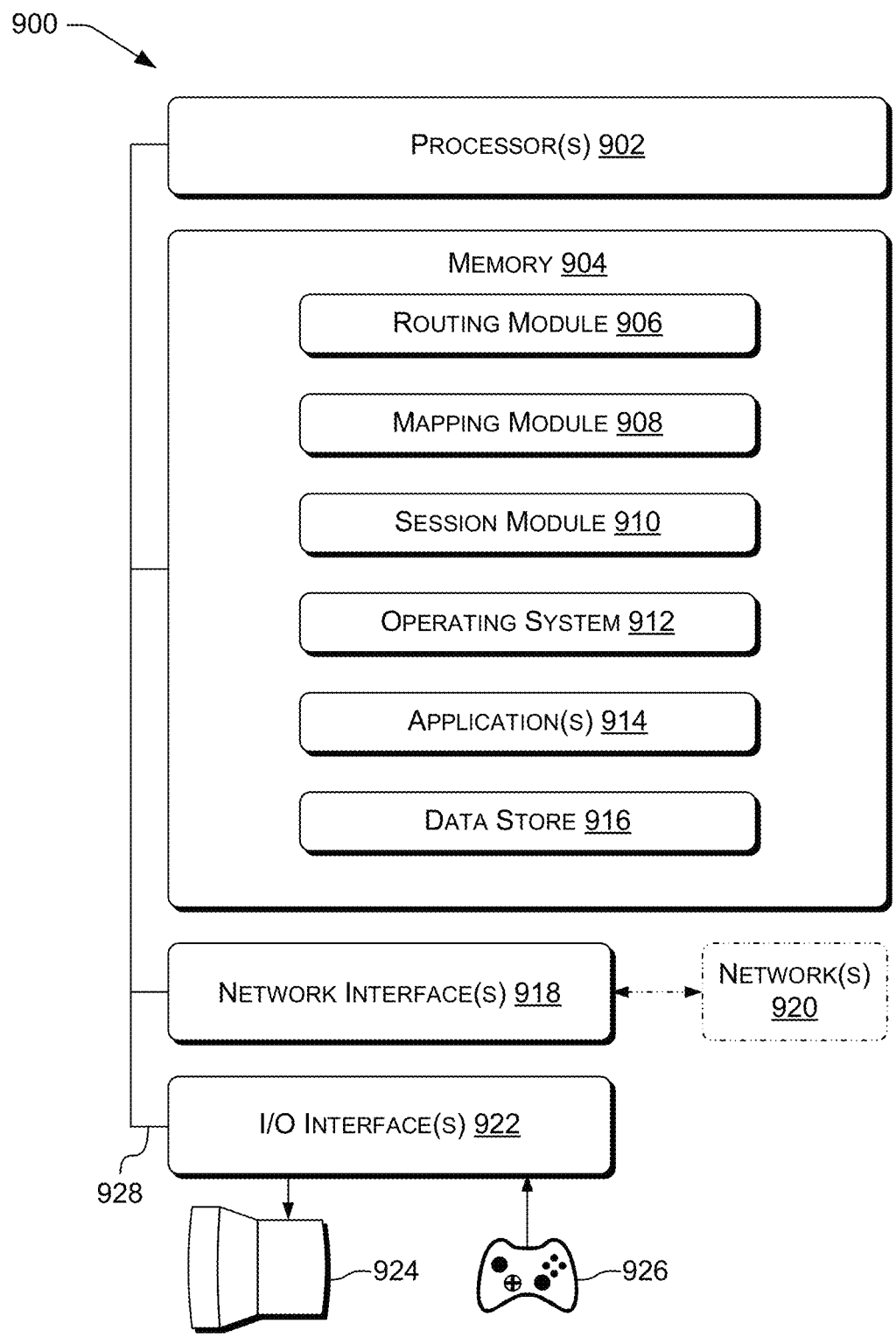
FIG. 9 is a block diagram depicting an example computing device configured to participate in establishment of communication sessions or routing according to some implementations.

FIG. 9 illustrates select components of an example computing device 900, which can represent at least one of terminals 102, 104, 106; routing device 114, responder 130, signaling gateway 136, media gateway 138, signaling gateway 140, media gateway 142, registry 152, registration device 158, terminal 202, or any of the computational components of access system 204, IMS 206, or peer system 236. In the illustrated example, computing device 900 includes one or more processor(s) 902 communicatively coupled with a memory 904. Memory 904 can be implemented as any combination of various types of memory components, e.g., computer-readable media (CRM) or computer storage media components. Examples of possible memory components include a random access memory (RAM), a disk drive, a mass storage component, and a non-volatile memory (e.g., solid-state disk, SSD, ROM, Flash, EPROM, EEPROM, etc.).

Processor(s) 902 can execute various instructions to control the operation of computing device 900 and to communicate with other electronic and computing devices. For example, the processor(s) 902 can be configured to execute modules of a plurality of modules, discussed below, on the memory 904. In some examples, the computer-executable instructions stored on the memory 904 can, upon execution, configure a computer such as a computing device 900 to perform operations described herein with reference to, e.g., the flowcharts above or modules below. The modules stored in the memory 904 can include instructions that, when executed by the one or more processor(s) 902, cause the one or more processor(s) 902 to perform operations described herein.

The memory 904 stores various information or data, including, for example, at least a routing module 906, a mapping module 908, a session module 910, an operating system 912, or one or more other applications 914. Functionality described associated with the illustrated components or modules can be combined to be performed by a fewer number of components or modules or can be split and performed by a larger number of components or modules. The other applications 914 can include, for example, an Internet browser such as a Web browser, a media player application, a video editing application, a video streaming application, a television viewing application, and so on. In some examples, computer-executable instructions of routing module 906, mapping module 908, session module 910, or applications 914 stored in at least one computer-readable medium (e.g., memory 904), when executed on processor 902 of computing device 900, direct computing device 900 to perform functions listed herein with respect to the relevant components in memory 904.

In some examples, routing module 906 is configured to perform routing processing 126, FIG. 1, or other functions described herein with reference to routing device 114, S-CSCF 232, or FIG. 3 or 8. In some examples, mapping module 908 is configured to perform functions described herein with reference to responder 130, Tier 1 responder 242, Tier 2 responder 244, or FIGS. 4-7. In some examples, session module 910, e.g., of a terminal 202, is configured to set up or tear down calls, e.g., by transmitting SIP INVITE or BYE requests, respectively, or to perform other functions described herein with reference to terminals 102, 104, 106, or 202. For example, session module 910 can implement a voice-telephony client, an SMS, RCS, or presence client, or a client of another telephony service.

In the illustrated example, memory 904 includes a data store 916. In some examples, data store 916 can store information described above, e.g., information of predetermined templates or hostnames described with reference to blocks 406 and 408.

The illustrated computing device 900 can include one or more network interface(s) 918 that can permit computing device 900 to communicate with other computing devices 900 via one or more network(s) 920, e.g., access networks 108, 110, or 112, serving networks 122 or 124, core networks such as core network 144, or other networks described herein. For example, network interface(s) 918 can establish or facilitate receiving wired or wireless network service. In some examples, at least one of the network interface(s) 918 can include, but is not limited to, a radio or transceiver for cellular (3G, 4G, or other), WI-FI, ultra-wideband (UWB), BLUETOOTH, satellite, or other wireless transmissions. At least one of the network interface(s) 918 can include a wired I/O interface, such as an Ethernet interface, a serial interface, a Universal Serial Bus (USB) interface, an INFINIBAND interface, or other wired interfaces. In some examples, a network interface 918 is an example of a communications interface. In some examples, e.g., when a single computer chassis houses components both of responder 130 and of registry 152, an interface between processor(s) 902 and memory 904, e.g., a memory-bus controller, is an example of a communications interface.

The illustrated computing device 900 can include one or more input/output (I/O) interfaces 922, that can include, or be communicatively connected with, for example, a display device 924, enabling computing device 900 to present video content. In example implementations, I/O interface 922 provides signals to a touchscreen or other display device.

I/O interface(s) 922 can additionally or alternatively include, or be communicatively connected with, for example, a user-operable input device 926 (graphically represented as a gamepad), enabling a user to, e.g., direct computing device 900 to establish connections to specific destinations. User-operable input device 926 can include, e.g., a touch sensor over a touchscreen, a user-operable button, switch, or other physical input control, an optical sensor, e.g., to detect finger position with respect to a screen, a mouse, a trackball, a joystick, or a pointing stick such as a TRACKPOINT. In some examples, user-operable input device 926 can represent "Send" control 116 or call-acceptance control 132.

Although shown separately, some of the components of computing device 900 can be implemented together in a single hardware device, such as in a Field-Programmable Gate Array (FPGA), an Application Specific Integrated Circuit (ASIC), Application-specific Standard Product (ASSP), System-On-a-Chip system (SoC), Complex Programmable Logic Device (CPLD), Digital Signal Processor (DSP), or other type of customizable processor. For example, a processor 902 can represent a hybrid device, such as a device from ALTERA or XILINX that includes a CPU core embedded in an FPGA fabric. These or other hardware logic components can operate independently or, in some instances, can be driven by a CPU. In some examples, processor 902 can be or include one or more single-core processors, multi-core processors, central processing unit (CPUs), graphics processing units (GPUs), general-purpose GPUs (GPGPUs), or hardware logic components configured, e.g., via specialized programming from modules or APIs, to perform functions described herein.

In some examples, a system bus 928 typically connects the various components within computing device 900. A system bus 928 can be implemented as one or more of any of several types of bus structures, including a memory bus or memory controller, a peripheral bus, an accelerated graphics port, or a local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus, e.g., a Mezzanine bus. In some examples, a communications interface can include interface electronics permitting communication via system bus 928.

Any of the components illustrated in FIG. 9 can be implemented in hardware, software, or a combination of hardware and software. Further, any of the components illustrated in FIG. 9, e.g., memory 904, can be implemented using any form of computer-readable media that is accessible by computing device 900, either locally or remotely, including over a network 920. Computer-readable media includes two types of computer-readable media, namely computer storage media and communications media. Computer storage media (e.g., a computer storage medium) includes tangible storage units such as volatile memory, nonvolatile memory, or other persistent or auxiliary computer storage media, removable and non-removable computer storage media implemented in any method or technology for storage of information such as computer-readable instructions, data structures, program modules, or other data.

Computer storage media includes tangible, non-transitory, or other physical forms of media included in a device or hardware component that is part of a device or external to a device. Tangible computer-readable media, e.g., computer storage media, can include volatile and nonvolatile, removable and non-removable media implemented in any method or technology for storage of information, such as computer readable instructions, data structures, program modules, or other data. Example computer storage media can include, but are not limited to, random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or memories, storage, devices, or storage media that can be used to store and maintain information for access by a computing device 900.

In contrast to computer storage media, communication media can embody computer-readable instructions, data structures, program modules, or other data in a modulated data signal, such as a carrier wave, or other transmission mechanism. As defined herein, computer storage media does not include communication media. In some examples, memory 904 can be or include computer storage media.

Computing device(s) 900, e.g., terminals 102-106, may be implemented as any suitable mobile terminals configured to communicate over a wireless and/or wireline network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), a networked digital camera, and/or similar mobile devices. Although this description predominantly describes the terminals 102-106 as being "mobile" or "wireless," (e.g., configured to be carried and moved around), it is to be appreciated that the terminals 102-106 may represent various types of communication devices that are generally stationary as well, such as televisions, desktop computers, game consoles, set top boxes, and the like. User equipment can include user cellular equipment or other telecommunications or terminals communicatively connectable with other terminals via one or more routing device(s) 114. Mobile phones and copper-loop landline phones can be examples of user equipment.

Example networks 920, e.g., access networks 108, 110, and 112, can include LTE, WIFI, GSM EDGE Radio Access Network (GERAN), UMTS Terrestrial Radio Access Network (UTRAN), and other cellular access networks. Access networks 108, 110, and 112 can provide wide-area wireless coverage using a technology such as GSM, Code Division Multiple Access (CDMA), UMTS, LTE, or the like. Example access networks 108, 110, and 112 can at least one of include Time Division Multiple Access (TDMA), Evolution-Data Optimized (EVDO), Advanced LTE (LTE+), Generic Access Network (GAN), Unlicensed Mobile Access (UMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), VoIP, VoLTE, IEEE 802-series protocols such as IEEE 802.15.1 ("Bluetooth"), wireless microwave access (WIMAX), and WIFI, and/or any future IP-based network technology or evolution of an existing IP-based network technology. Core network 144 can include any of these types of networks or networks designed to interoperate with those types of networks, e.g., an Evolved Packet Core (EPC) or IMS network. In some examples, network communications with terminals 102, 104, or 106 can additionally or alternatively be performed using non-wireless networks 920, such as electrical wired connections (e.g., Plain Old Telephone Service, POTS, or PSTN lines), optical (e.g., Synchronous Optical NETwork, SONET) technologies, Asynchronous Transfer Mode (ATM), and the like.

In some examples, networks 920, e.g., core network 144 or access networks 108, 110, and 112, can carry voice or data. For example, a data network of networks 920 can carry voice traffic using Voice over Internet Protocol (VoIP) or other technologies as well as data traffic, or a cellular network of networks 920 can carry data packets using High Speed Packet Access (HSPA), LTE, or other technologies as well as voice traffic. Some cellular networks 920 carry both data and voice in a PS format. For example, many LTE networks carry voice traffic in data packets according to the voice-over-LTE (VoLTE) standard. Various examples herein provide origination and termination of, e.g., operator-grade voice calls on, e.g., networks 920 using CS transports or mixed VoLTE/3G transports, or on terminals 102 including original equipment manufacturer (OEM) handsets and non-OEM handsets.

EXAMPLE CLAUSES

A: A telecommunication system, comprising: a routing device (e.g., an S-CSCF or ISBC/IBCF) configured to: receive an initiation request of a communication session, the initiation request including a destination identifier associated with a terminal (e.g., a UE or other network-attached device); provide, to a responder, a query for serving-network (e.g., an an access network operated by the operator of the routing device, or another operator's network.) information associated with the terminal; and forward (e.g., possibly including modifying the request) the initiation request to a serving network identified by the serving-network information; and the responder (e.g., an ENUM proxy) configured to: receive from the routing device the query including the destination identifier; request, from a registry, network-attachment information indicating a current media path (e.g., CS, or PS, or another operator) associated with the terminal; determine the serving-network information based at least in part on the network-attachment information; and provide, to the routing device, a query response based at least in part on the serving-network information.

B: The telecommunication system according to paragraph A, wherein the forwarding comprises forwarding the initiation request to an inbound proxy (e.g., an I-CSCF or BGCF) of the serving network.

B2: The telecommunication system according to paragraph A, wherein the routing device is configured to forward the initiation request to an inbound proxy of the serving network.

C: The telecommunication system according to any of paragraphs A-B2, further comprising the inbound proxy communicatively connectable with the routing device, wherein the inbound proxy comprises at least one of an interrogating call session control function (I-CSCF) or a border gateway control function (BGCF).

D: The telecommunication system according to any of paragraphs A-C, wherein the routing device is configured to forward the initiation request without establishing a connection with the registry.

E: The telecommunication system according to any of paragraphs A-D, further comprising a registration device communicatively connectable with the terminal and the registry communicatively connectable with the registration device, wherein the registry is configured to receive at least part of the network-attachment information from the registration device.

F: The telecommunication system according to any of paragraphs A-E, wherein the initiation request comprises a Session Initiation Protocol (SIP) INVITE message, the query comprises an E.164 Number Mapping (ENUM) Domain Name System (DNS) query, the serving-network information comprises a hostname of an inbound proxy of the serving network, and the requesting comprises: determining a query key based at least in part on the destination identifier; and providing the query key to the registry, and receiving the network-attachment information, using the Diameter protocol.

G: A network device, comprising: a communications interface (e.g., a memory interface or network interface); at least one processor; and a memory (e.g., at least one of: at least one computer-readable memory; at least one computer storage medium; or at least one tangible, non-transitory computer-readable medium) storing instructions that, when executed by the at least one processor, cause the at least one processor to perform operations comprising: receiving, via the communications interface, a query comprising a global name (e.g., an E.164 number or other called-party ID that is not operator-specific) associated with a terminal; retrieving, from a registry and via the communications interface, network-attachment information associated with the global name and with a current media path of the terminal; determining a local name (e.g., a routable name, e.g., a SIP URI)

based at least in part on the network-attachment information; and transmitting, via the communications interface, an indication of the local name.

H: The network device according to paragraph G, wherein the registry is a remote registry and the operations further comprise: transmitting the global name to the registry via the communications interface; and receiving, from the registry and via the communications interface, the network-attachment information.

I: The network device according to paragraph G or H, wherein the network-attachment information comprises an indication of an access-network type (e.g., PS or CS) associated with the terminal.

J: The network device according to paragraph I, wherein the local name comprises a tag (e.g., "ims" or "tel") uniquely associated with the access-network type.

K: The network device according to any of paragraphs G-J, wherein the operations further comprise: retrieving the network-attachment information indicating a transformation rule; and applying the transformation rule (e.g., a regular-expression substitution) to at least part of the global name to provide the local name.

L: The network device according to any of paragraphs G-K, wherein the global name comprises or represents a telephone number.

M: The network device according to paragraph L, wherein the local name comprises at least one of a "sip" Uniform Resource Identifier (URI) or a "tel" URI.

N: The network device according to any of paragraphs G-M, wherein the query comprises an E.164 Number Mapping (ENUM) query.

O: The network device according to any of paragraphs G-N, wherein the operations further comprise transmitting, via the communications interface, a Naming Authority Pointer (NAPTR) record comprising the indication of the local name.

P: The network device according to any of paragraphs G-O, wherein the operations further comprise retrieving the network-attachment information by querying the registry using the Diameter protocol.

Q: A method, comprising: receive an initiation request of a communication session to be established with a destination; query a responder for serving-network information indicating a current media path associated with the destination; and forward the initiation request to a serving network identified by the serving-network information.

R: The method according to paragraph Q, the receiving comprising receiving the initiation request from at least one of a Telephony Application Server (TAS) or a Network-Network Interconnection (NNI) peer device.

S: The method according to paragraph Q or R, further comprising, before the forwarding: determining that at least one of the following conditions holds: (1) a query response omits the serving-network information, or (2) no query response was received; and in response, determining the serving-network information including a network address of an interconnection device.

T: The method according to paragraph S, further comprising determining that a timeout associated with the query has expired without the query response being received.

U: A computer-readable medium, e.g., a computer storage medium, having thereon computer-executable instructions, the computer-executable instructions upon execution configuring a computer to perform operations as any of paragraphs Q-T recites.

V: A device comprising: a processor; and a computer-readable medium, e.g., a computer storage medium, having thereon computer-executable instructions, the computer-executable instructions upon execution by the processor configuring the device to perform operations as any of paragraphs Q-T recites.

W: A system comprising: means for processing; and means for storing having thereon computer-executable instructions, the computer-executable instructions including means to configure the system to carry out a method as any of paragraphs Q-T recites.

X: A computer-readable memory (e.g., at least one computer storage medium or at least one tangible, non-transitory computer-readable medium) storing instructions that, upon execution by a processor, cause the processor to perform operations recited in any of paragraphs G-P.

Y: At least one computer-readable memory (e.g., at least one computer storage medium or at least one tangible, non-transitory computer-readable medium) storing instructions that, upon execution by at least one processor, cause the processor to perform operations recited in any of paragraphs A-F.

CONCLUSION

Various aspects described above permit routing initiation requests or other services messages of a communication session more directly to an appropriate serving network. Various examples permit routing to specific domains of an operator's network or to other operators' networks using the same routing device. Technical effects of various examples can include reducing latency and bandwidth consumption of initiation-request processing compared to prior schemes.

Example data transmissions (parallelograms) in FIG. 1, example data flows in FIG. 2, and example blocks in the process diagrams of FIGS. 3-8 represent one or more operations that can be implemented in hardware, software, or a combination thereof to transmit or receive described data or conduct described exchanges. In the context of software, the illustrated blocks and exchanges represent computer-executable instructions that, when executed by one or more processors, cause the processors to transmit or receive the recited data. Generally, computer-executable instructions, e.g., stored in program modules that define operating logic, include routines, programs, objects, modules, components, data structures, and the like that perform particular functions or implement particular abstract data types. Except as expressly set forth herein, the order in which the transmissions or operations are described is not intended to be construed as a limitation, and any number of the described transmissions or operations can be combined in any order and/or in parallel to implement the processes. Moreover, structures or operations described with respect to a single server or device can be performed by each of multiple devices, independently or in a coordinated manner, except as expressly set forth herein.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances. Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

As used herein, a message described as "associated with" a data item can include that data item, or can include information that, alone or in combination with other information, permits retrieval of that data item. For example, a message can be associated with a destination network address, e.g., by including the destination network address or by including a destination hostname that can be used to retrieve a corresponding destination network address from a database (e.g., the Internet Domain Name System, DNS).

Conditional language such as, among others, "can," "could," "might" and/or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples and/or that one or more examples necessarily include logic for deciding, with and/or without user input and/or prompting, whether certain features, elements and/or steps are included and/or are to be performed in any particular example. The word "or" and the phrase "and/or" are used herein in an inclusive sense unless specifically stated otherwise. Accordingly, conjunctive language such as, but not limited to, at least the phrases "X, Y, or Z," "at least X, Y, or Z," "at least one of X, Y or Z," and/or any of those phrases with "and/or" substituted for "or," unless specifically stated otherwise, is to be understood as signifying that an item, term, etc., can be either X, Y, or Z, or a combination of any elements thereof (e.g., a combination of XY, XZ, YZ, and/or XYZ). Moreover, in the claims, any reference to a group of items provided by a preceding claim clause is a reference to at least some of the items in the group of items, unless specifically stated otherwise.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A telecommunication system, comprising:
a routing device configured to:
receive an initiation request of a communication session, the initiation request including a destination identifier associated with a terminal;
provide, to a responder, a Domain-Name System (DNS) query for serving-network information associated with the terminal;
forward the initiation request to a serving network identified by the serving-network information, wherein forwarding the initiation request includes forwarding the initiation request to an I-CSCF is based at least in part on the serving-network information indicating a registered IMS; and
the responder configured to:
receive, from the routing device, the DNS query including the destination identifier;
retrieve, from a home subscriber server (HSS) and using a Diameter protocol, network-attachment information indicating an Internet Protocol (IP) Multimedia Subsystem (IMS) registration state and a current media path associated with the terminal and comprising an indication of an access-network type associated with the terminal and a transformation rule including a regular expression and a replacement text;
determine the serving-network information based at least in part on the network-attachment information;
provide, to the routing device, a query response based at least in part on the serving-network information; and
in response to the IMS registration state being negative, cause the routing device to forward the initiation request by communicating with the serving network without contacting an interrogating call session control function (I-CSCF), wherein forwarding the initiation request is based at least in part on the serving-network information failing to indicate the registered IMS.

2. The telecommunication system according to claim 1, wherein the routing device is configured to forward the initiation request to an inbound proxy of the serving network.

3. The telecommunication system according to claim 1, further comprising an inbound proxy communicatively connectable with the routing device, wherein the inbound proxy comprises at least one of the I-CSCF or a border gateway control function (BGCF).

4. The telecommunication system according to claim 1, wherein the routing device is configured to forward the initiation request without establishing a connection with the HSS.

5. The telecommunication system according to claim 1, further comprising a registration device communicatively connectable with the terminal and the HSS communicatively connectable with the registration device, wherein the HSS is configured to receive at least part of the network-attachment information from the registration device.

6. The telecommunication system according to claim 1, wherein:
the initiation request comprises a Session Initiation Protocol (SIP) INVITE message;
the serving-network information comprises a hostname of an inbound proxy of the serving network; and
the retrieving the network-attachment information comprises:
determining a query key based at least in part on the destination identifier.

7. The telecommunication system according to claim 1, wherein the serving-network information comprises at least: a "sip" Uniform Resource Identifier (URI), a "tel" URI, a domain name, or a DNS Naming Authority Pointer (NAPTR) record.

8. The telecommunication system according to claim 1, wherein the routing device includes a serving call session control function (S-CSCF) operated by a first operator, and the responder includes a first tier ENUM server and a second tier ENUM server; and in response to receiving the DNS query, the responder is configured to:
determine that the first tier ENUM server and the second tier ENUM server are operated by the first operator; and
determine that the second tier ENUM server can communicate directly with the HSS.

9. A method comprising, by a first network node:
receiving, from a Network-Network Interconnection (NNI) peer device, a first initiation request of a first communication session to be established with a first destination;
querying a responder using a Domain-Name System (DNS) protocol for first serving-network information indicating a first media path associated with the first destination;

determining, as a condition, that a query response omits the first serving-network information;

forwarding, based at least in part on the condition including an Internet Protocol (IP) Multimedia Subsystem (IMS) registration state and the first media path indicating a packet-switched (PS) type, the first initiation request to an interrogating call session control function (I-CSCF) identified by the first serving-network information wherein forwarding the first initiation request to the I-CSCF is based at least in part on the first serving-network information indicating a registered IMS;

receiving, from the NNI peer device, a second initiation request of a second communication session to be established with a second destination;

sending, to the responder using the DNS protocol, a query for second serving-network information indicating a second media path associated with the second destination;

receiving, from the responder in response to the query, the second serving-network information;

forwarding, based at least in part on the second media path indicating a CS type, the second initiation request to a second network node identified by the second serving-network information, the second network node comprising at least a SIP Routing Engine (SRE) or a Border Gateway Control Function (BGCF), wherein forwarding the second initiation request to the second network node is based at least in part on the second serving-network information failing to indicate the registered IMS; and receiving the first initiation request and the second initiation request at an Interconnect Session Border Controller (ISBC) or Interconnection Border Control (IBCF).

10. The method according to claim 9, wherein:
the first serving-network information comprises a first DNS Naming Authority Pointer (NAPTR) record and at least: a first "sip" Uniform Resource Identifier (URI), a first "tel" URI, or a first domain name;

the querying includes a query for NAPTR records, and determining that the query response omits the first serving-network information includes determining the query response fails to include at least one NAPTR record; and the second serving-network information comprises at least: a second "sip" URI, a second "tel" URI, a second domain name, or a second DNS NAPTR record.

11. One or more non-transitory computer-readable media storing computer executable instructions that, when executed, cause one or more processors to perform operations comprising:

receiving, from a Network-Network Interconnection (NNI) peer device, a first initiation request of a first communication session to be established with a first destination;

querying a responder using a Domain-Name System (DNS) protocol for first serving-network information indicating a first media path associated with the first destination;

determining, as a condition, that a query response omits the first serving-network information;

forwarding, based at least in part on the condition including an Internet Protocol (IP) Multimedia Subsystem (IMS) registration state and the first media path indicating a packet-switched (PS) type, the first initiation request to an interrogating call session control function (I-CSCF) identified by the first serving-network information wherein forwarding the first initiation request to the I-CSCF is based at least in part on the first serving-network information indicating a registered IMS;

receiving, from the NNI peer device, a second initiation request of a second communication session to be established with a second destination;

sending, to the responder using the DNS protocol, a query for second serving-network information indicating a second media path associated with the second destination;

receiving, from the responder in response to the query, the second serving-network information;

forwarding, based at least in part on the second media path indicating a CS type, the second initiation request to a second network node identified by the second serving-network information, the second network node comprising at least a SIP Routing Engine (SRE) or a Border Gateway Control Function (BGCF), wherein forwarding the second initiation request to the second network node is based at least in part on the second serving-network information failing to indicate the registered IMS; and receiving the first initiation request and the second initiation request at an Interconnect Session Border Controller (ISBC) or Interconnection Border Control (IBCF).

12. The one or more non-transitory computer-readable media of claim 11, wherein the first serving-network information comprises a first DNS Naming Authority Pointer (NAPTR) record and at least: a first "sip" Uniform Resource Identifier (URI), a first "tel" URI, or a first domain name.

13. The one or more non-transitory computer-readable media of claim 11, wherein the querying includes a query for NAPTR records, and determining that the query response omits the first serving-network information includes determining the query response fails to include at least one NAPTR record.

14. The one or more non-transitory computer-readable media of claim 11, wherein the second serving-network information comprises at least: a second "sip" URI, a second "tel" URI, a second domain name, or a second DNS NAPTR record.

* * * * *